3,428,479
ANCHORING COMPOSITION FOR FILM AND FILM ANCHORED THEREWITH
Robert Alan Dobransky, Stamford, Conn., assignor to American Cyanamid Company, Stamford, Conn., a corporation of Maine
No Drawing. Filed Feb. 25, 1966, Ser. No. 529,965
U.S. Cl. 117—76                10 Claims
Int. Cl. C08j 1/39; B32b 25/08; B44d 1/22

The present invention relates to a latex which possesses the property of providing polystyrene and nylon film with a topcoat-receptive surface. The invention includes the latex itself, polystyrene and nylon film having a coating of the latex solids in reacted state, with or without a topcoat of hydrophobic organic material thereover.

U.S. application Serial No. 536,525 filed February 25, 1966 by M. M. Donaldson and A. R. Morris discloses that an aqueous dispersion of a polyol and a polymethylolamidogen in thermosetting proportions is an effective anchoring agent for hydrophobic organic film; i.e., when applied to the surface of hydrophobic organic film and heated, the polyol and the polymethylolamidogen interreact on the surface of the film and form a unitary resin which renders the surface of the film receptive to hydrophobic organic topcoat material. In the case of polystyrene film and nylon (polyamide) film, the amount of receptivity which is imparted by the resin is only moderate.

Topcoated polystyrene film and topcoated nylon film possess superior heat-sealing properties and resistance to permeability by gases (particularly oxygen and water vapor). These topcoated films are thus better suited for use as a wrapping material for food and other oxidizable commodities.

The discovery has now been made that a fluid aqueous latex comprising (a) a water-insoluble vinyl copolymer composed of a minor amount of lower hydroxyalkyl acrylate linkages, (b) a water-dispersible alkyd resin containing at least 2 etherifiable hydroxyl substituents per macromolecule, and (c) sufficient of a poly(methylol) amidogen (or lower alkyl ether thereof) to form a unitary resin by reaction with said polymer and said alkyd resin, in preferred instances possesses the property of rendering the surface of polystyrene film and of nylon film highly receptive to hydrophobic organic topcoat material. The resin thus acts as an efficient primer or anchor agent.

The latex of the present invention, in its simplest form, is a fluid aqueous dispersion at any convenient solids content of the three components specified above in unreacted or in partially pre-reacted state. The latex may have a solids content in the range of 30% to 50%, and this is advantageous when the latex is to be shipped as it permits shipping charges to be minimized. The latex may be diluted extensively with water, and it is convenient to decrease the solids content of the latex to 5%–10% when it is desired to apply the latex to film or other shaped articles of the substrates mentioned.

The composition may contain a catalyst to accelerate reaction of the amidogen with the other components of the composition. The catalyst may be a strong acid (sulfuric acid, p-toluene sulfonic acid, etc.) in which event the composition should be used promptly, or a latent acid catalyst may be used (a salt of a strong acid with a volatile base). Such latent catalyst is virtually inert at room temperature and hence may be introduced into the latex at any point of manufacture of the latex.

The water-insoluble vinyl polymer specified above as the first component of the latex is a copolymer of one or more than one of the lower hydroxyalkyl acrylates (which are water-soluble) with sufficient of one or more at most only slightly (i.e., less than 10%) water-soluble vinyl monomers, the amount of the latter being sufficiently large and its solubility sufficiently low that the polymer as a whole is substantially water-insoluble.

Among the hydroxyalkyl acrylates which can be employed are the n-hydroxyethyl, n-hydroxypropyl and n-hydroxybutyl acrylates.

Among the water-insoluble vinyl monomers which can be employed are styrene, ethyl acrylate, propyl acrylate, octadecyl acrylate, acrylonitrile, and vinyl acetate. Our experience to date indicates that a polymer which provides better anchoring is obtained by the use of two monomers in admixture, one being a water-insoluble monomer which forms a soft and tacky homopolymer and the other being a monomer which forms a hard and glassy homopolymer. Preferred compositions are accordingly prepared by copolymerizing a minor amount, say 5 to 25 mol percent, of a $C_2$–$C_6$ hydroxyalkyl acrylate with 95 to 75 mol percent of a 50:50 mixture of ethyl acrylate (which forms a soft tacky homopolymer) and styrene (which forms a hard and glassy homopolymer).

The aforementioned monomers may be copolymerized in any convenient way, and we have found it entirely feasible to prepare these copolymers by emulsion copolymerization in the presence of a redox catalyst.

The water-dispersible alkyd resin which is the second component of the latex of the present invention has a molecular weight in excess of 1,500 and contains at least 2 etherifiable hydroxyl substituents per macromolecule. Resins of this type are conveniently prepared by reacting to a low acid number polyol with a polybasic acid, the proportions between the two being selected so that in the end product, hydroxyl groups are present in slight excess over any remaining carboxy groups.

For purposes of the present invention the best alkyd resin appears to be a cross-linked long chain (linear) polyester such as is formed by reacting a mixture of a major amount of a diol (for example, glycol) and a minor amount of a triol or higher polyol (for example, glycerol or sorbitol) with a dibasic acid. The triol or higher polyol acts to provide cross-linking sites along the linear polyester chain with which the dibasic acid reacts.

In the preparation of these alkyd resins the molar ratio between the diol and the triol or higher polyol is between about 20:1 to 5:1, and the total number of hydroxyl substituents in the diol and the triol to the total number of carboxy substituents in the dicarboxylic acid is about 1:1. A ratio of 1.1:1 provides an alkyd resin of low molecular weight which contains a desirable number of hydroxyl groups.

The number of hydroxyl substituents in the alkyd resin can be determined by calculations based on the percentage reaction of the hydroxyl substituents as determined by the acid number of the polymer.

Whether or not these substituents are etherifiable can be determined by refluxing a 20% by weight acidic aqueous dispersion of the alkyd resin with an equivalent amount based on the hydroxyl substituents present in the hexakis (methoxymethyl)melamine. Formation of a gel shows that the hydroxyl groups present are etherifiable.

The third component of the mixture is a polymethylol amidogen or a lower alkyl ether thereof. The amount of such amidogen which is present in the composition is that which is sufficient to form a unitary resin the two aforementioned components by an etherification therewith. Formation of a unitary resin occurs when the components, when heated in the presence of a latent acid catalyst on a glass plate at 250° F. for 10 minutes, form a continuous film which is not soluble in water, benzene, ethyl acetate or ethanol.

The polymethylol amidogen compounds which are present in the compositions of the present invention may be for example trimethylolmelamine, hexamethylolmelamine, dimethylolurea, trimethylolbiuret, dimethylolformoguanamine, dimethylolacetoguanamine, dimethylolthiourea, dimethylol dicyandiamide, and partial or complete lower alkyl ethers thereof, for example, di(methoxymethyl)urea and hexakis (methoxymethyl)melamine. The ethers are preferred because they appear to possess better water-solubility and more rapid reactivity with the vinyl polymer and the alkyd resin than the methylol compounds.

The weight ratio of the alkyd resin to the copolymer is critical. It must be between about 7:3 and 1:9, poor anchoring occurring when the ratio of these two components falls outside of the range.

The latex of the present invention may contain materials which are customarily present in film primers and coating compositions, for example, titanium dioxide white, carbon black, and phthalocyanine blue; a perfume to mask any odor present; and oil-soluble dyes.

For anchoring purposes the latex is applied to the film in such amount that the coating of solids which remains after the film is dried weighs between roughly 1 and 5 ounces per thousand square feet of film area. The most effective amount in any instance can be readily determined by laboratory trial. If preferred, the latex may be applied at greater concentrations, in which event the composition acts as a self-anchoring topcoat.

The anchoring properties of the composition develop after the applied latex is caused to dry in normal manner by passage of the film through a forced-draft oven having a temperature in the range of 200°–250° F. Good anchoring is obtained within 30 seconds and no significant improvement in anchoring is noted when the film is maintained in the above-stated temperature range for more than 3 minutes.

The invention is more particularly disclosed in the examples which are preferred embodiments and which are not to be construed as limitations thereon.

Example 1

The following is the preparation of a preferred latex according to the present invention.

To 100 cc. of a 10% by weight latex of a 1:3:6 molar ratio 2-hydroxyethyl methacrylate:styrene:ethyl acrylate (prepared by emulsion copolymerization of the components in the stated molar ratios in aqueous medium at reflux temperature containing ammonium persulfate as catalyst and sodium lauryl sulfate as emulsifying agent) is added first sufficient trimethylamine to adjust the pH to about 7.5. There is then added with rapid stirring 100 cc. of a 10% by weight aqueous dispersion of an alkyd resin having a molecular weight of about 1600 and containing about 2 etherifiable hydroxyl groups per macromolecule [formed by reacting a mixture of 12 mols of neopentyl glycol and 2 mols of trimethylol ethane with 14 mols of a 9:3:1 molar ratio isophthalic acid:tetrahydrophthalic anhydride:adipic acid mixture at 230° C. to an acid number of 15, dispersing 1 g. part by weight of the hot product in about 3 parts by weight of ammoniacal water (pH 8) at 55° C., adding 0.4 parts of isopropyl alcohol, and sufficient water to adjust the solids content of the dispersion to 10% by weight] 4.9 g. of molten hexakis(methoxymethyl)melamine and 0.5 g. of the trimethylamine salt of methanesulfonic acid as latent acid catalyst.

In the latex the weight ratio of the vinyl polymer to the polyol-polyester is about 1:1.

The latex has a pH of about 7.5 and is stable for at least 3 months.

Example 2

A latex is prepared by the method of Example 1 except that the vinyl polymer of Example 1 is replaced by an equal weight of a 1:3:6 molar ratio 2-hydroxypropyl methacrylate:methyl methacrylate:ethyl acrylate copolymer.

Example 3

A latex is prepared by the method of Example 1 except that the alkyd resin used therein is replaced by an equal amount of the alkyd resin formed by reaction of a 12:2:2 molar ratio mixture of neopentyl glycol, trimethylol ethane and mixed glycols of 300–1500 molecular weight with 14 mols of a 13:1 molar ratio tetrahydrophthalic anhydride:adipic acid mixture.

Example 4

The following illustrates the anchoring effectiveness of the above-described agents on polystyrene film and on nylon film.

The styrene film used is unoxidized unplasticized commercial polystyrene film 7.5 mil. thick. The nylon film used is likewise of commercial grade and is 1 mil. thick; it is immersed for 5 seconds in 2% alcoholic sulfuric acid at 25° C. to neutralize any surface alkalinity.

A sample of the polystyrene film is coated with a 0.25 mil. thick layer of the anchoring latex of Example 1 by use of a No. 3 Mayer rod [a steel rod ¼" in diameter closely rolled with fine (No. 3) wire]. The wet coated film is hung vertically in a laboratory oven for 30 seconds at 110° C., during which time the aqueous phase evaporates and the vinyl polymer, the alkyd resin and the amidogen interact to form a unitary resin.

The resulting dry, glossy primed film is then coated with a layer 0.1 mil. thick of a 60% by weight aqueous emulsion of saran by use of a No. 3 Mayer rod. This coating is dried and heat-bonded to the primer (anchor) coating by suspending the film for 30 seconds in an oven at 110° C.

The procedure is repeated using the latices of Examples 2 and 3, and is further repeated using an alkyd resin lacquer, an acrylic resin and a furniture varnish as the topcoats, and is still further repeated using the neutralized nylon film as the substrate.

Control anchor compositions are prepared by the above method by the use of the above latex from which in one instance the alkyd resin is omitted, in a second instance the vinyl polymer is omitted, and in a third instance the amidogen is omitted, and are applied to the polystyrene and nylon films in the manner described.

The receptivity of the resulting films for topcoat material is determined by application of a 6" length of pressure-sensitive (polyvinyl chloride "Scotch" tape) to the surface of the film, removing the tape with a swift ripping motion, and noting how much if any of the topcoat is thereby removed.

The test is applied first to the topcoated surface of the film which has not been scored (scratched with a knife).

If no topcoat should be removed by this test, the surface of the film is scored by scratching an X through the topcoat (and perhaps through the anchor coat) with the point of a knife, after which the test is repeated.

If no topcoat should be removed by this latter test, the surface of the film is further scored by scratching several X's in the same way and repeating the test.

If no topcoat should be removed by this test, many small X's are scored and the test is repeated once more. Results are recorded on the following scale:

| Treatment of Topcoat | Amt. of Topcoat Removed by Tape | Receptivity Rating |
|---|---|---|
| Unscored | All | 0 |
|  | About half | 1 |
|  | None | 2 |
| Scored with one X | All* | 3 |
|  | About half* | 4 |
|  | None | 5 |
| Scored with several X's | All* | 6 |
|  | About half* | 7 |
|  | None | 8 |
| Scored with many X's | A little* | 9 |
|  | None | 10 |

*Around the X or X's.

On this scale, a rating of 3–5 is regarded as satisfactory, and a rating of 9–10 is regarded as excellent.

| Run No. | Film | Anchor Agent | Topcoat | Receptivity Rating [1] |
|---|---|---|---|---|
| C-1 | Styrene | None | Saran [2] | 0 |
| C-2 | do | Latex, no alkyd resin | do | 3 |
| C-3 | do | Latex, no vinyl polymer | do | 3 |
| C-4 | do | Latex, no amidogen | do | 0 |
| 1 | do | Composition of Ex. 1 | do | 10 |
| 2 | do | Composition of Ex. 2 | do | 7 |
| 3 | do | Composition of Ex. 3 | do | 9 |
| 4 | do | Composition of Ex. 1 | Alkyd enamel [3] | 10 |
| 5 | do | Composition of Ex. 1 | Acrylic lacquer [4] | 10 |
| 6 | do | Composition of Ex. 1 | Rustoleum [5] | 10 |
| 7 | do | do | Varnish [6] | 9 |
| C-5 | Nylon | None | Saran [2] | 0 |
| C-6 | do | Latex, no alkyd resin | do | 3 |
| C-7 | do | Latex, no vinyl polymer | do | 3 |
| C-8 | do | Latex, no amidogen | do | 0 |
| 8 | do | Composition of Ex. 1 | do | 8 |
| 9 | do | Composition of Ex. 2 | do | 6 |
| 10 | do | Composition of Ex. 3 | do | 7 |

[1] For ratings see table above.
[2] Vinylidene chloride-acrylonitrile copolymer.
[3] Delux, green (E. I. du Pont de Nemours & Co.).
[4] Lucite, green (E. I. du Pont de Nemours & Co.).
[5] A quick-drying anti-rust lacquer (Rustoleum Corp.).
[6] A clear gloss varnish for wood (Supervalspar, Valspar Corp.).

Comparison of the anchor results achieved by the control runs (runs C-1—C-4 inc.) with the remaining runs shows that the excellent anchoring is due to a synergistic action among the alkyd resin, the vinyl polymer and the amidogen, and not to the action of any one or pair of the components.

Example 5

The following illustrates the effect of variations in the ratio of the vinyl copolymer to the alkyd resin in an anchoring latex according to the present invention.

Styrene film (unoxidized) is anchor coated by the method of Example 4 employing the latex described in Example 1 and similar latices wherein the ratio of the copolymer to the alkyd resin is varied as is shown in the table below. The resulting film is dried, topcoated with saran, and tested for its anchoring properties as shown in Example 4.

Results are as follows:

| Run No. | Film | Copolymer:Alkyd Resin Ratio in Latex | Receptivity Rating [1] |
|---|---|---|---|
| 1 | Styrene | 0:100 | 3 |
| 2 | do | 10:90 | 3 |
| 3 | do | 20:80 | 3 |
| 4 | do | 30:70 | 7–8 |
| 5 | do | 40:60 | 9 |
| 6 | do | 50:50 | 9–10 |
| 7 | do | 60:40 | 5 |
| 8 | do | 70:30 | 5 |
| 9 | do | 80:20 | 5 |
| 10 | do | 90:10 | 5 |
| 11 | do | 100:0 | 3 |

[1] For description of ratings see Example 1.

These results show that the presence of the copolymer in a polyhydroxy alkyd resin blend with an amidogen makes a major improvement in the blend as anchoring agent.

I claim:
1. A fluid aqueous topcoat anchoring latex comprising a water-insoluble vinyl polymer composed to the extent of 5 to 25 mol percent of ($C_2$–$C_6$ hydroxyalkyl) acrylate linkages, a water-dispersible alkyd resin having a molecular weight in excess of about 1,500 and containing at least about 2 etherifiable hydroxyl substituents per macromolecule, and sufficient of a material selected from the group consisting of poly(methylol)amidogens and lower alkyl ethers thereof to form a unitary resin by reaction with said vinyl polymer and said alkyd resin, the weight ratio of said vinyl polymer to said alkyd resin being between about 3:7 and 9:1.

2. A latex according to claim 1 wherein the water-insoluble polymer is a 1:3:6 mol ratio 2-hydroxyethyl acrylate:styrene:ethyl acrylate copolymer.

3. A latex according to claim 1 wherein the weight ratio of the vinyl polymer to the alkyd resin is about 1:1.

4. A latex according to claim 1 wherein the alkyd resin is a 12:2:14 molar ratio neopentyl glycol:trimethylol ethane:dibasic acid mixture, said dibasic acid mixture being a mixture of isophthalic acid in major molar proportion and tetrahydrophthalic anhydride and adipic acid in minor molar proportions.

5. A latex according to claim 1 wherein the amidogen is hexakis(methoxymethyl)melamine.

6. A latex according to claim 1 containing a latent acid catalyst.

7. A latex according to claim 1 containing sufficient of a volatile base to impart to said latex a pH above 7.

8. Polystyrene film carrying an anchor coating of the dried residue of the interreacted vinyl polymer, alkyd resin and amidogen of claim 1.

9. Film according to claim 8 carrying a topcoat of hydrophobic organic material on said anchor coating.

10. Nylon film carrying a coating of the dried residue of the interreacted vinyl polymer, alkyd resin and amidogen of claim 1.

References Cited

UNITED STATES PATENTS

| 2,819,237 | 1/1958 | Daniel | 260—29.4 |
| 2,852,475 | 9/1958 | Christenson et al. | |
| 3,081,278 | 3/1963 | Wohnsiedler. | |
| 3,322,561 | 5/1967 | Kumins. | |

WILLIAM D. MARTIN, *Primary Examiner.*

R. HUSACK, *Assistant Examiner.*

U.S. Cl. X.R.

117—138.8, 161, 47; 260—29.4, 29.6

UNITED STATES PATENT OFFICE
CERTIFICATE OF CORRECTION

Patent No. 3,428,479 February 18, 1969

Robert Alan Dobransky

It is certified that error appears in the above identified patent and that said Letters Patent are hereby corrected as shown below:

Column 5, in the second table, the heading to the fifth column, line 1 thereof, the garbled letters should read -- Recep- --; same table, first column, lines 5 to 8, the numerbers "1", "2", "3", and "4" should be realigned to match the lines in the remaining columns; same table, footnote 3 thereof, "Delux" should read -- Dulux --.

Signed and sealed this 24th day of March 1970.

(SEAL)
Attest:

Edward M. Fletcher, Jr.
Attesting Officer

WILLIAM E. SCHUYLER, JR.
Commissioner of Patents